United States Patent
Shimada et al.

(10) Patent No.: US 6,799,724 B2
(45) Date of Patent: Oct. 5, 2004

(54) CARD SOCKET

(75) Inventors: Masaaki Shimada, Hamura (JP); Keiichiro Suzuki, Kodaira (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/457,095

(22) Filed: Jun. 5, 2003

(65) Prior Publication Data

US 2004/0016806 A1 Jan. 29, 2004

(30) Foreign Application Priority Data

Jul. 29, 2002 (JP) ........................................ 2002-219510

(51) Int. Cl.[7] .................................................. G06K 7/00
(52) U.S. Cl. ..................................... 235/439; 235/492
(58) Field of Search ............................... 235/239, 492, 235/482, 486, 483

(56) References Cited

U.S. PATENT DOCUMENTS

| | | | | |
|---|---|---|---|---|
| 5,949,048 A | * | 9/1999 | Nakamura et al. ........... | 235/439 |
| 6,478,630 B1 | * | 11/2002 | Hsu ............................ | 439/680 |
| 6,503,092 B1 | * | 1/2003 | Sato ............................ | 439/159 |
| 6,609,919 B2 | * | 8/2003 | Ito et al. ..................... | 439/159 |
| 6,648,660 B2 | * | 11/2003 | Sato et al. .................. | 439/159 |

FOREIGN PATENT DOCUMENTS

JP        09-035021 A        2/1997

* cited by examiner

*Primary Examiner*—Thien M. Le
*Assistant Examiner*—Uyen-Chau N. Le
(74) *Attorney, Agent, or Firm*—Frishauf, Holtz, Goodman & Chick, P.C.

(57) ABSTRACT

There is provided a card socket having a simple construction capable of preventing erroneous insertion of a smaller card than a predetermined one. An erroneous card insertion-preventing member has a fixed portion fixed to the housing, an elastic portion coupled to the fixed portion, and a stopper coupled to the elastic portion. The elastic portion is elastically deformed when a predetermined card is inserted so as to be pushed out of a card insertion path, but not elastically deformed when a card having a smaller size than the predetermined one is inserted so as to remain on the path. The predetermined card can be inserted deeply due to the stopper being moved out of the path in accordance with the deformation of the elastic portion, whereas the card having the smaller size is blocked by the stopper.

9 Claims, 23 Drawing Sheets

CARD SOCKET

BACKGROUND OF THE INVENTION

1. Field of the Invention

This invention relates to a card socket that allows insertion and ejection of a card, such as an IC card and a magnetic card, and more particularly to a card socket that is capable of inhibiting insertion of a card having a smaller size than a predetermined size.

2. Description of the Prior Art

A card socket is used, for example, as a card connector for connecting an IC card to electronic equipment, a component part of a magnetic card reader/writer, etc.

A conventional card socket includes a housing and erroneous card insertion-preventing means.

The housing has a card insertion port and a card-receiving space for receiving a card inserted through the card insertion port.

The erroneous card insertion-preventing means is a device that allows a card to be inserted to the inner part of the card-receiving space when the card has a predetermined thickness, and prevents a card from being inserted to the inner part of the card-receiving space when the card has a smaller thickness than the predetermined thickness.

The erroneous card insertion-preventing means is comprised of a plurality of members, and inhibits insertion of a card having a smaller thickness than the predetermined thickness (see Japanese Laid-Open Patent Publication (Kokai) No. 9-35021).

In the above publication, the erroneous card insertion-preventing means is comprised of a sensor lever having a sensing piece and a pressing piece, and a shutter lever having a contact piece and a shutter piece.

In this example, an IC card having the predetermined thickness is inserted through the card insertion port to have its leading end pass by the sensing piece of the sensor lever, the sensor lever pivotally moves through a predetermined angle and presses the contact piece of the shutter lever by the pressing piece thereof to cause the shutter piece of the shutter lever to be retracted from a card insertion path to allow the advance of the IC card into a card-receiving space. On the other hand, when an object having a smaller thickness than the predetermined thickness is inserted, the pressing piece of the sensor lever is not brought into contact with the contact piece of the shutter lever, and hence the shutter piece stays in the card passage to block the advance of the inserted object into the card-receiving space.

However, the construction of the erroneous card insertion-preventing means of the conventional card socket is complicated as described above, which is liable to cause malfunction. Further, the erroneous card insertion-preventing means is susceptible to failure, and what is worse, the manufacturing cost thereof is high.

SUMMARY OF THE INVENTION

It is an object of the invention to provide a card socket which is capable of preventing erroneous insertion of a card having a smaller size than a predetermined size by a simplified construction.

To attain the above object, according to a first aspect of the invention, there is provided a card socket comprising:

a housing having a card insertion port and a card-receiving space that receives a card inserted through the card insertion port;

an elastic member that is arranged on a card insertion path extending from the card insertion port to an inner end of the card-receiving space, for being brought into contact with the card on condition that the card has a predetermined size, to thereby undergo elastic deformation such that the elastic member is pushed out of the card insertion path; and a stopper that is coupled to the elastic member, and arranged on the card insertion path, for being pushed out of the card insertion path in accordance with the elastic deformation of the elastic member to allow the advance of the card when the card has the predetermined size, and for remaining on the card insertion path to block the advance of the card when the card has a size smaller than the predetermined size.

According to this card socket, it is possible to prevent erroneous insertion of a card having a size smaller than a predetermined size, by a simpler construction than the conventional card socket.

Preferably, the housing includes an elastic member-receiving recess for receiving the elastic member that has undergone the elastic deformation to be pushed out of the card insertion path, and a stopper-receiving recess for receiving the stopper that has been pushed out of the card insertion path in accordance with the elastic deformation of the elastic member.

More preferably, the card socket further comprises a fixing member that is integrally formed with the elastic member, for fixing the elastic member to a front end of the housing at a location out of the card insertion path, and the elastic member is arranged such that the elastic member extends obliquely from the fixing member into the card insertion path when the elastic member has not undergone the elastic deformation, the stopper being integrally formed with the elastic member at an opposite side to the fixing member with respect to a card-inserting direction.

Further preferably, the stopper vertically projects from at least one of two lateral sides of the elastic member, and the stopper-receiving recess comprises at lest one cutout formed in a manner associated with the stopper such that the at least one cutout each divides a corresponding one of keys provided at inner lateral walls of the housing, whereby the card socket prevents insertion of the card when the card has a thickness smaller than a thickness of the predetermined size.

Further preferably, the elastic member comprises a pair of elastic members extending in the form of a strip along immediately inward of inner lateral walls of the housing, and the stopper extends laterally such that the stopper connects the pair of elastic members, the stopper-receiving recess being laterally formed in an inner bottom of the housing in association with the stopper, whereby the card socket prevents insertion of the card when the card has a width smaller than a width of the predetermined size.

Further preferably, the elastic member comprises a pair of elastic members extending in the form of a strip along inner lateral walls of the housing, and the stopper comprises a first stopper vertically projecting from at least one of two lateral sides of the elastic member, and a second stopper extending laterally such that the second stopper connects the pair of elastic members, the stopper-receiving recess comprising at lest one cutout formed in association with the first stopper such that the at least one cutout each divides a corresponding one of keys provided at the inner lateral walls, and a lateral recess laterally formed in an inner bottom of the housing in association with the second stopper, whereby the card socket prevents insertion of the card when the card has a thickness smaller than a thickness of the predetermined size or a width smaller than a width of the predetermined size.

To attain the above object, according to a second aspect of the invention, there is provided a card socket including a housing having a card insertion port and a card-receiving space that receives a card inserted through the card insertion port, and erroneous card insertion-preventing means that when the card has a predetermined thickness, allows insertion of the card to an inner end of the card-receiving space, and when the card has a thickness smaller than the predetermined thickness, prevents insertion of the card toward the inner end of the card-receiving space, wherein the erroneous card insertion-preventing means comprises:

a fixed portion fixed to the housing;

an elastic portion coupled to the fixed portion, for being elastically deformed when a card having the predetermined thickness is inserted through the card insertion port, to be pushed out of a card insertion path extending from the card insertion port to the inner end of the card-receiving space, and for not being elastically deformed when a card having a thickness smaller than the predetermined thickness is inserted through the card insertion port, to remain on the card insertion path; and a stopper coupled to the elastic portion, for being moved out of the card insertion path when the elastic portion is pushed out of the card insertion path, to thereby allow the advance of the card having the predetermined thickness, and for remaining on the card insertion path when the elastic portion is not pushed out of the card insertion path, to thereby block the advance of the card having the thickness smaller than the predetermined thickness.

According to this card socket, the erroneous card insertion-preventing means is comprised of the fixed portion, the elastic portion coupled to the fixed portion, and the stopper coupled to the elastic portion, and these portions are integrally formed with each other. Therefore, it is possible to prevent erroneous insertion of a card having a thickness smaller than the predetermined thickness by the erroneous card insertion-preventing means having a simpler construction than the conventional erroneous card insertion-preventing means.

To attain the above object, according to a third aspect of the invention, there is provided a card socket including a housing having a card insertion port and a card-receiving space that receives a card inserted through the card insertion port, and erroneous card insertion-preventing means that when the card has a predetermined width, allows insertion of the card to an inner end of the card-receiving space, and when the card has a width smaller than the predetermined width, prevents insertion of the card toward the inner end of the card-receiving space, wherein the erroneous card insertion-preventing means comprises:

a fixed portion fixed to the housing;

an elastic portion coupled to the fixed portion, for being elastically deformed when a card having the predetermined width is inserted through the card insertion port, to be pushed out of a card insertion path extending from the card insertion port to the inner end of the card-receiving space, and for not being elastically deformed when a card having a width smaller than the predetermined width is inserted through the card insertion port, to remain on the card insertion path; and a stopper coupled to the elastic portion, for being moved out of the card insertion path when the elastic portion is pushed out of the card insertion path, to thereby allow the advance of the card having the predetermined width, and for remaining on the card insertion path when the elastic portion is not pushed out of the card insertion path, to thereby block the advance of the card having the width smaller than the predetermined width.

According to this card socket, it is possible to prevent erroneous insertion of a card having a width smaller than the predetermined width by the erroneous card insertion-preventing means having a simpler construction than the conventional erroneous card insertion-preventing means.

To attain the above object, according to a fourth aspect of the invention, there is provided a card socket including a housing having a card insertion port and a card-receiving space that receives a card inserted through the card insertion port, and erroneous card insertion-preventing means that when the card has a predetermined thickness and a predetermined width, allows insertion of the card to an inner end of the card-receiving space, and when the card has a thickness smaller than the predetermined thickness or a width smaller than the predetermined width, prevents insertion of the card toward the inner end of the card-receiving space, wherein the erroneous card insertion-preventing means comprises:

a fixed portion fixed to the housing;

an elastic portion coupled to the fixed portion, for being elastically deformed when a card having the predetermined thickness and the predetermined width is inserted through the card insertion port, to be pushed out of a card insertion path extending from the card insertion port to the inner end of the card-receiving space, and for not being elastically deformed when a card having a thickness smaller than the predetermined thickness or a width smaller than the predetermined width is inserted through the card insertion port, to remain on the card insertion path; and a stopper coupled to the elastic portion, for being moved out of the card insertion path when the elastic portion is pushed out of the card insertion path, to thereby allow the advance of the card having the predetermined thickness and width, and for remaining on the card insertion path when the elastic portion is not pushed out of the card insertion path, to thereby block the advance of the card having the thickness smaller than the predetermined thickness or the width smaller than the predetermined width.

According to this card socket, it is possible to prevent erroneous insertion of a card having a thickness smaller than the predetermined thickness or a card having a width smaller than the predetermined width by the erroneous card insertion-preventing means having a simpler construction than the conventional erroneous card insertion-preventing means.

The above and other objects, features and advantages of the present invention will become more apparent from the following description taken in conjunction with the accompanying drawings.

DETAILED DESCRIPTION OF THE PREFERRED EMBODIMENTS

The invention will now be described in detail with reference to the drawings showing preferred embodiments thereof.

Figure 1:
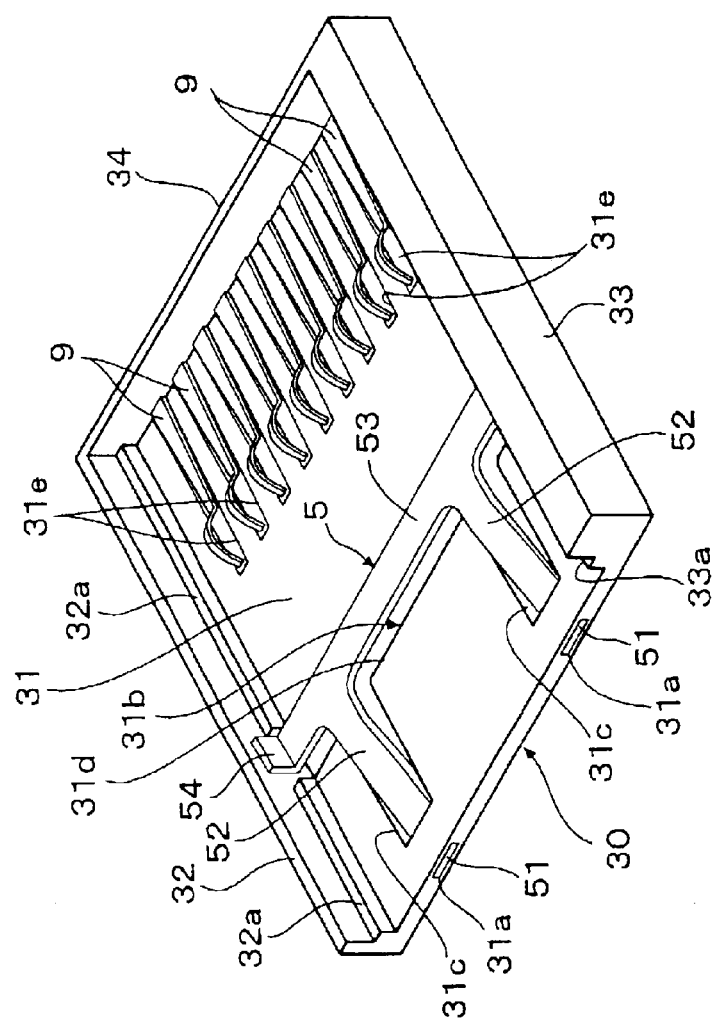
FIG. 1 is a perspective view of a card connector according to a first embodiment of the invention, with a cover removed therefrom.
Figure 2:
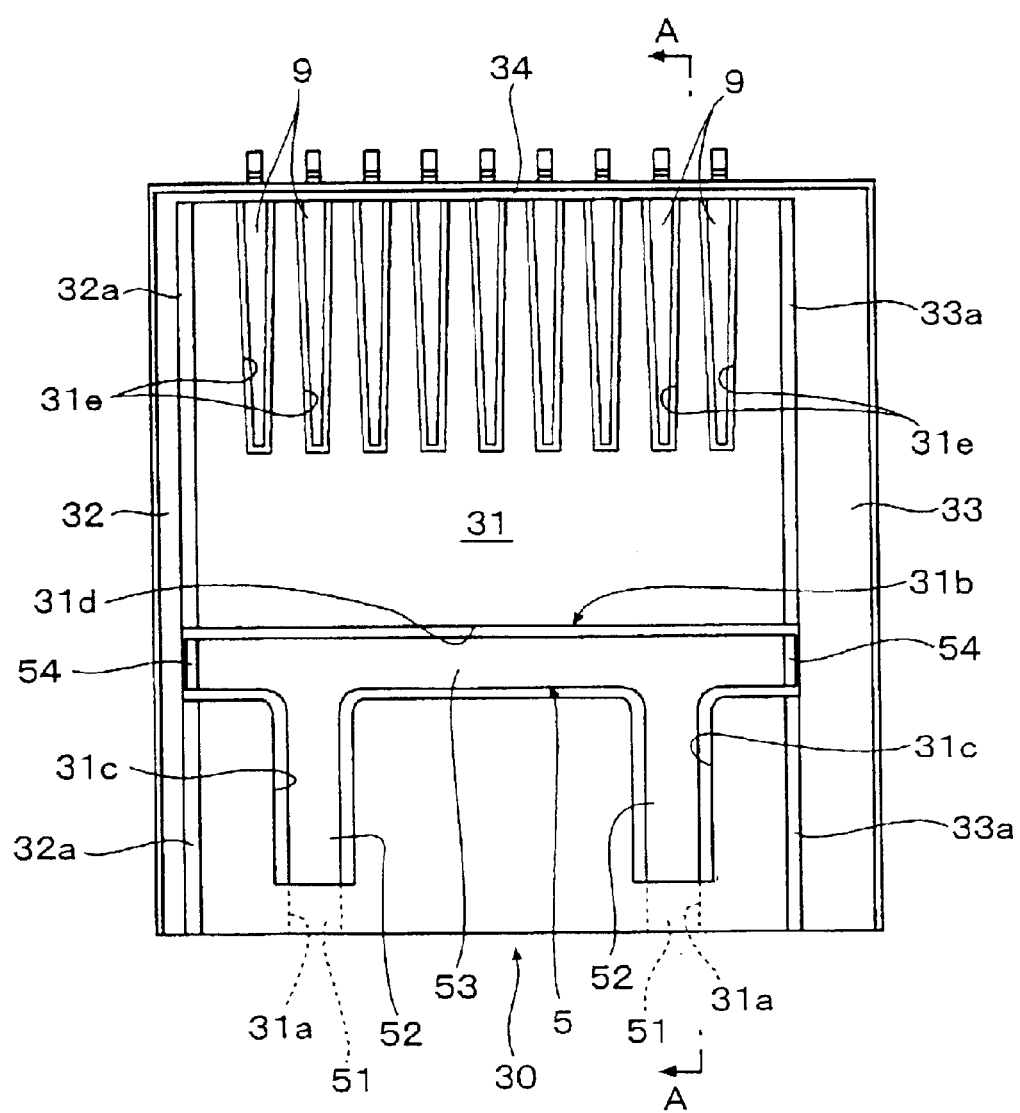
FIG. 2 is a plan view of the FIG. 1 card connector, with the cover removed therefrom.
Figure 3:
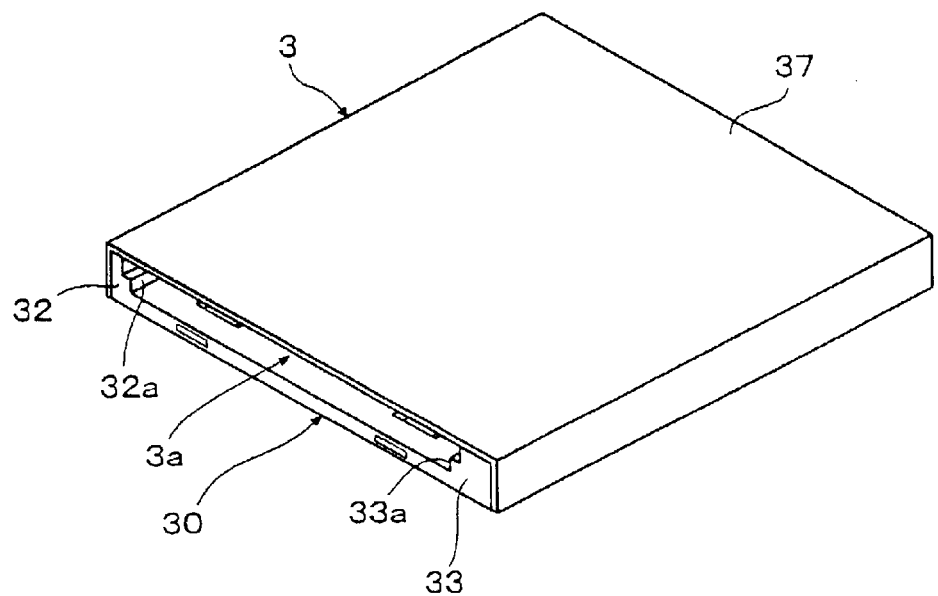
FIG. 3 is a perspective view of the appearance of the FIG. 1 card connector.
Figure 4:
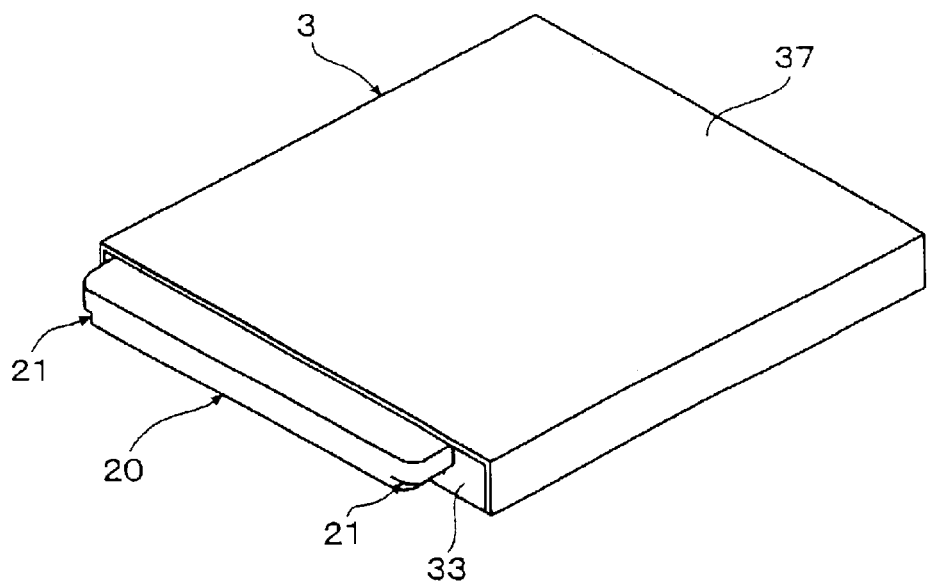
FIG. 4 is a perspective view of the appearance of the FIG. 1 card connector having an IC card of a predetermined size inserted therein.
Figure 5:
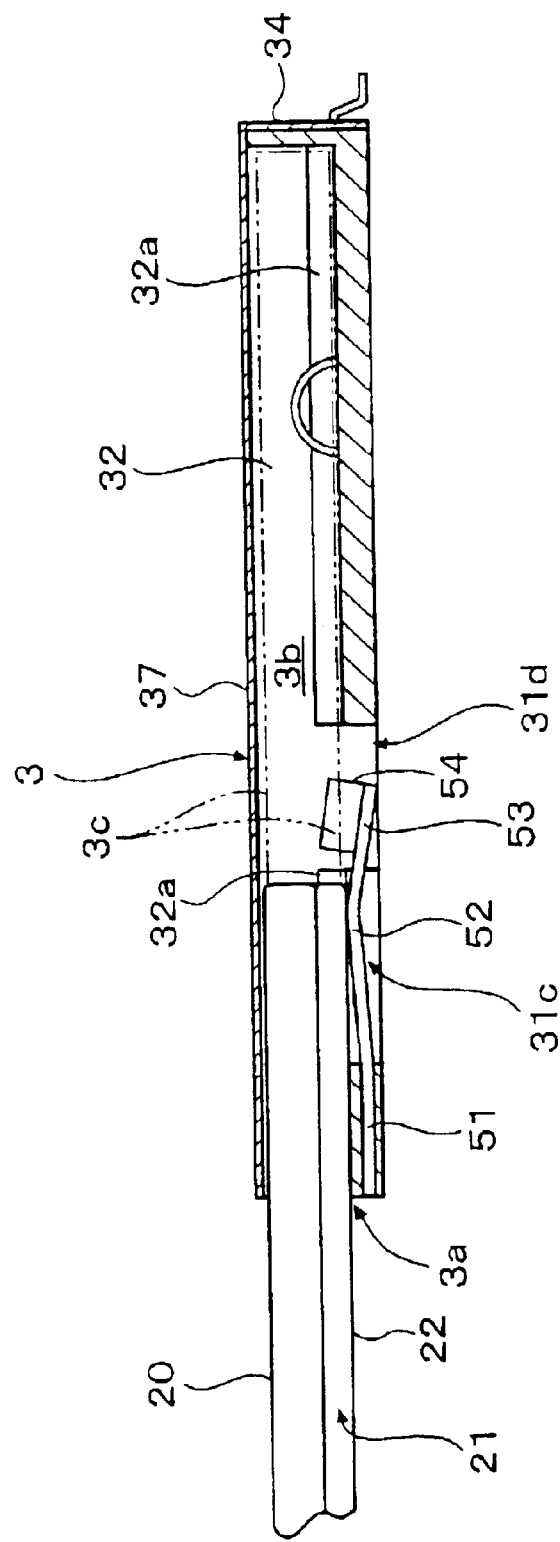
FIG. 5 is a cross-sectional view taken on line A—A of FIG. 2 and showing the FIG. 1 card connector having the IC card of the predetermined size inserted therein.
Figure 6:
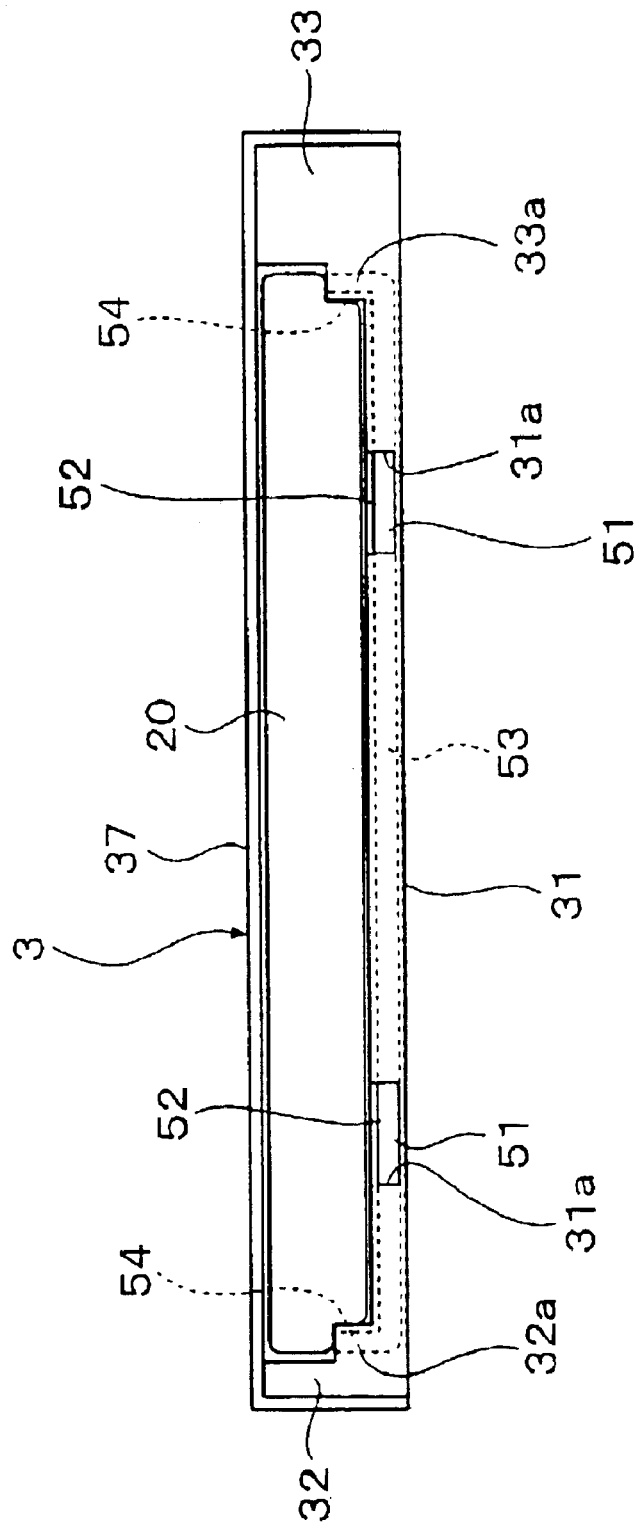
FIG. 6 is a front view of the FIG. 1 card connector having the IC card of the predetermined size inserted therein.
Figure 7:
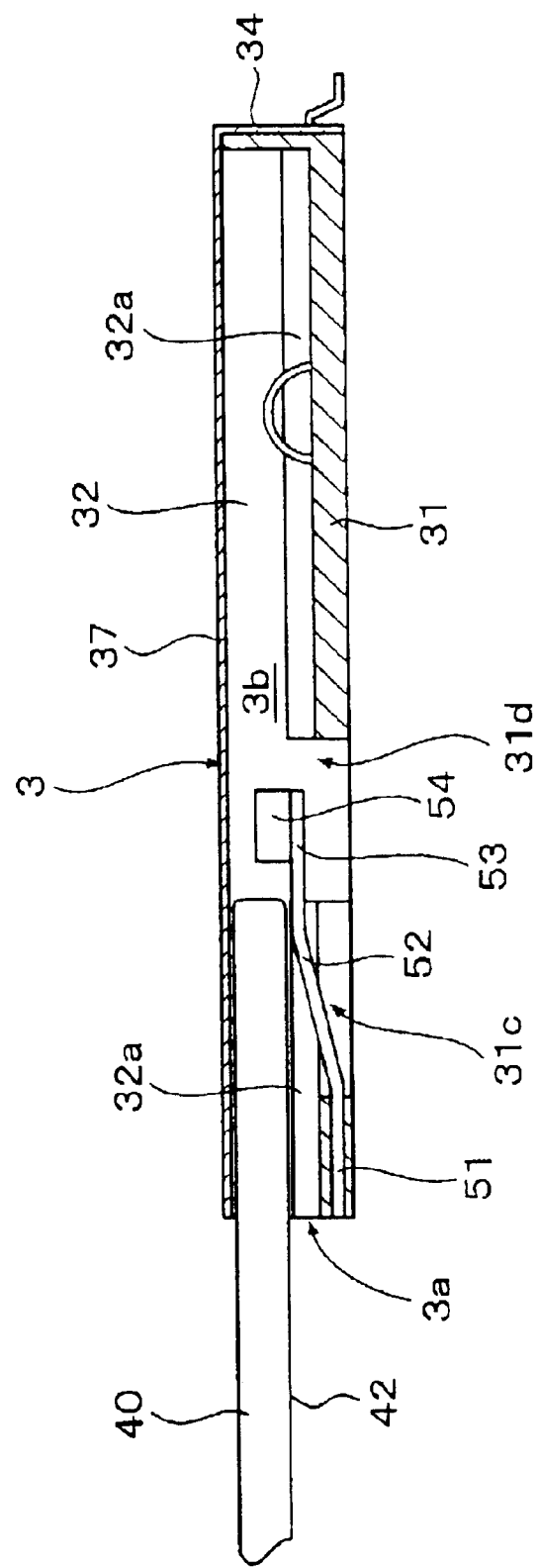
FIG. 7 is a cross-sectional view taken on line A—A of FIG. 2 and showing the FIG. 1 card connector having an IC card inserted therein which is of a size smaller in thickness than the predetermined size.
Figure 8:
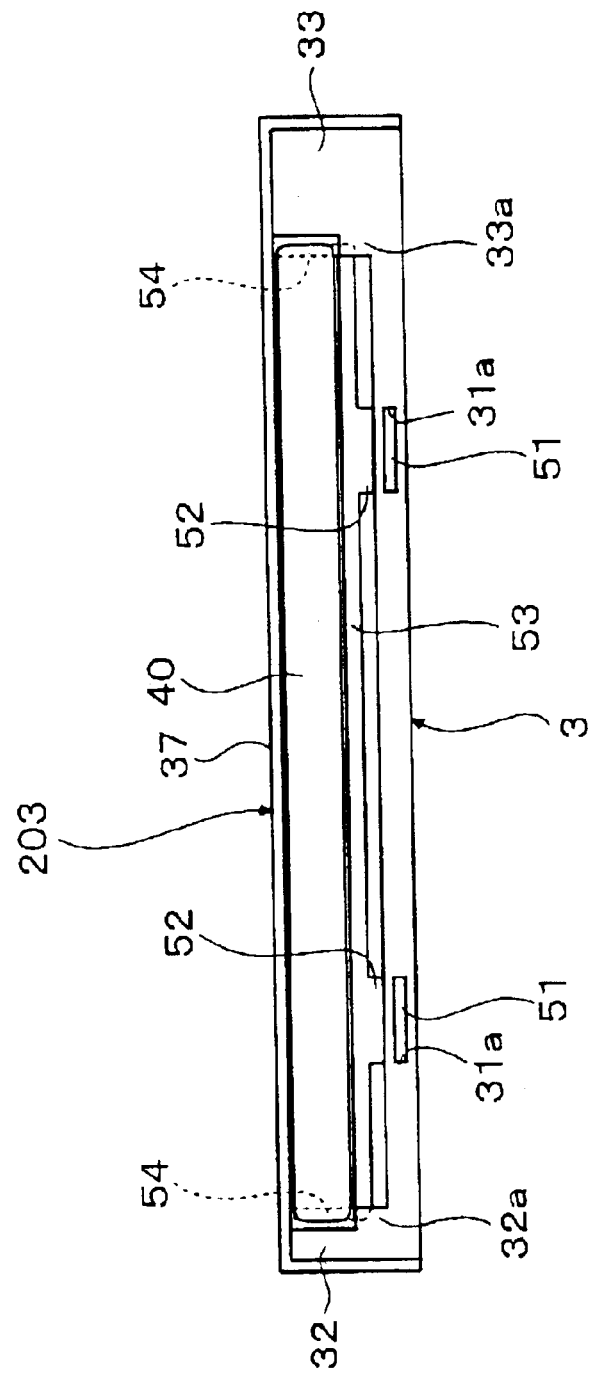
FIG. 8 is a front view of the FIG. 1 card connector having the IC card inserted therein which is of the size smaller in thickness than the predetermined size.

FIG. 1 is a perspective view of a card connector according to a first embodiment of the invention, with a cover removed therefrom, while FIG. 2 is a plan view of the same, with a cover removed therefrom. FIG. 3 is a perspective view of the appearance of the FIG. 1 card connector, and FIG. 4 is a perspective view of the appearance of the FIG. 1 card connector having an IC card of a predetermined size inserted therein. FIG. 5 is a cross-sectional view taken on line A—A of FIG. 2 and showing the FIG. 1 card connector in the state shown in FIG. 4. FIG. 6 is a front view of the FIG. 1 card connector in the state shown in FIG. 4. FIG. 7 is a cross-sectional view taken on line A—A of FIG. 2 and showing the FIG. 1 card connector having an IC card inserted therein which is of a size smaller in thickness than the predetermined size. FIG. 8 is a front view of the FIG. 1 card connector in the state shown in FIG. 7.

This card connector (card socket) includes a housing 3 and an erroneous card insertion-preventing member (erroneous card insertion-preventing means) 5.

The housing 3 is comprised of a housing body 30 and a cover 37. The housing body 30 has a bottom wall 31, side walls 32, 33, and a rear wall 34. The bottom wall 31 is formed of a rectangular plate, and formed with a pair of retaining holes 31a, an erroneous insertion-preventing member-receiving recess 31b, and a plurality of contact insertion holes 31e. The pair of retaining holes 31a extend longitudinally from a front end face of the bottom wall 31 along the side walls 32, 33. The erroneous insertion-preventing member-receiving recess 31b is formed in a front portion of the bottom wall 31, and has a pair of elastic portion-receiving recesses 31c and a connecting portion-receiving recess 31d. The pair of elastic portion-receiving recesses 31c are continuous with the respective retaining holes 31a and extend longitudinally along the side walls 32, 33. The connecting portion-receiving recess 31d extends in a direction orthogonal to the direction of length of the side walls 32, 33 to join the pair of elastic portion-receiving recesses 31c.

The side walls 32, 33 each generally have the shape of a prism and are joined to respective side edges of the bottom wall 31. The side walls 32, 33 have keys 32a, 33a, respectively. The keys 32a, 33a are each divided by the connecting portion-receiving recess 31d.

The rear wall 34 has the shape of a plate and is joined to the rear edge of the bottom wall 31. The rear wall 34 has a plurality of contacts 9 fixed thereto. The contacts 9 are positioned above the contact insertion holes 31e, respectively.

The cover 37 is mounted on the housing body 30 in a manner covering the same, whereby a card insertion port 3a and a card-receiving space 3b are formed between the housing body 30 and the cover 37 (see FIGS. 3, 5 and 7).

The erroneous card insertion-preventing member 5 is formed by stamping an elastic metal plate and then pressing the stamped metal plate into shape. The erroneous card insertion-preventing member 5 has a pair of fixed portions 51, a pair of elastic portions 52, a connecting portion 53, and a pair of smaller thickness-card stoppers 54. The fixed portions 51 are in the form of a strip, and are retained in respective states inserted into the retaining holes, thereby fixing the erroneous card insertion-preventing member 5 to a front end of the housing 3, i.e. causing the erroneous card insertion-preventing member to be held in a state immovable in a direction along the side walls 32, 33. The elastic portions 52 are also in the form of a strip. The elastic portions 52 are continuous with the fixed portions 51, and extend longitudinally along the side walls 32, 33 through the elastic portion-receiving recesses 31c, respectively. The connecting portion 53 is also in the form of a strip, and extends in the direction orthogonal to the direction of length of the side walls 32, 33. The connecting portion 53 is formed in a manner continuous with the elastic portions 52, and positioned above the connecting portion-receiving recess 31d so long as the elastic portions 52 are not elastically deformed. The smaller thickness-card stoppers 54 are formed continuous with the respective opposite ends of the connecting portion 53, and extend vertically along the side walls 32, 33. As described above, the erroneous card insertion-preventing member 5 has a simple construction in which the fixed portions 51, the elastic portions 52, the connecting portion 53, and the stoppers 54 are integrally connected to each other.

Next, the operation of the card connector of the present embodiment will be described.

As shown in FIGS. 5 and 6, when one end of an IC card 20 of a predetermined size is inserted through the card insertion port 3a, the elastic portions 52 are pressed downward by the bottom surface 22 of the IC card 20 and elastically deformed by a predetermined amount. As a result, the elastic portions 52 are pushed out of a card insertion path 3c (path to be taken by the forward end face of the IC card 20 when the IC card 20 is received into the card-receiving space 3b). When the elastic portions 52 are pushed out of the card insertion path 3c, the connecting portion 53 is also pushed out of the card insertion path 3c and received into the connecting portion-receiving recess 31d. At the same time, the smaller thickness-card stoppers 54 are pushed out of the card insertion path 3c and brought into respective cutouts 21 formed at the lateral sides of the bottom of the IC card 20c. As a result, the smaller thickness-card stoppers 54 are kept from contact with the IC card 20, so that the smaller thickness-card stoppers 54 cannot block the advance of the IC card 20, and hence the IC card 20 is allowed to be inserted to the inner end of the card-receiving space 3b.

It should be noted that if an attempt is made to insert the IC card 20 in a state turned upside down, into the card insertion port 3a, the forward end face of the IC card 20 abuts against the keys 32a, 33a only to be inhibited from advancing.

As shown in FIGS. 7 and 8, when an IC card 40 having a size smaller in thickness than the predetermined size is inserted through the card insertion port 3a, the elastic portions 52 do not make contact with the bottom surface 42 of the IC card 40. Therefore, the elastic portions 52 are not elastically deformed, but stay on the card insertion path 3c, and hence the smaller thickness-card stoppers 54 also stay on the card insertion path 3c. Consequently, if the IC card 40 is attempted to be inserted deeper into the card-receiving space 3b, the forward end face of the IC card 40 is bought into abutment with the smaller thickness-card stoppers 54, which blocks further advance of the IC card 40.

As described above, the card connector of the present embodiment makes it possible to prevent erroneous insertion of the IC card 40 having the size smaller in thickness than the predetermined size, using an erroneous card insertion-preventing member 5 having a simple construction.

Figure 9:
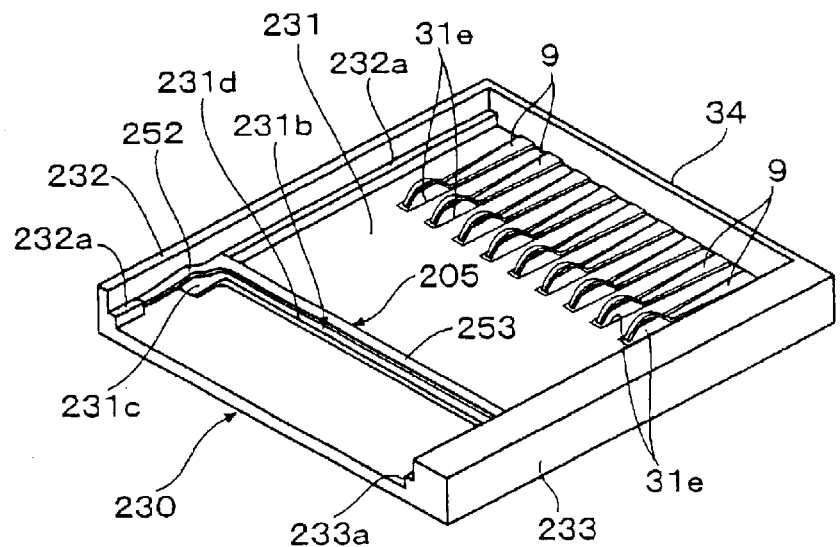
FIG. 9 is a perspective view of a card connector according to a second embodiment of the invention, with a cover removed therefrom.
Figure 10:
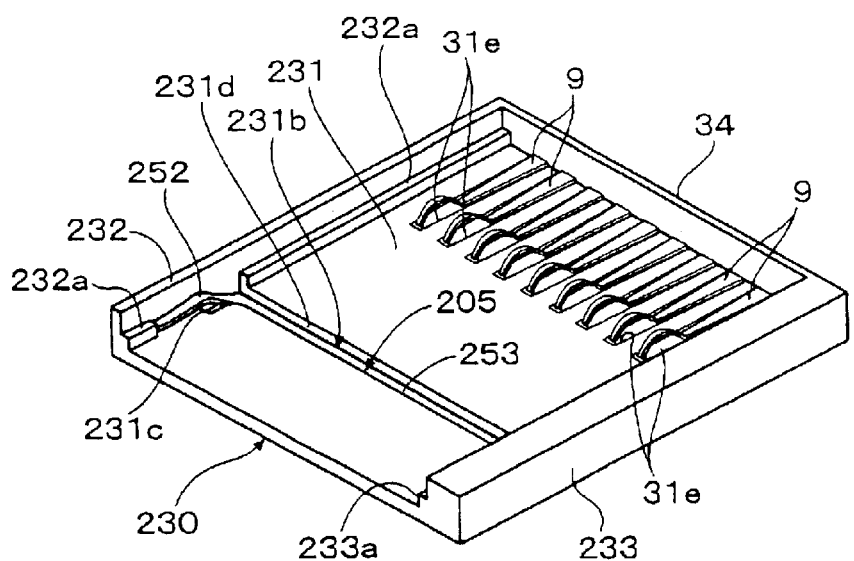
FIG. 10 is a perspective view of the FIG. 9 card connector in a state in which elastic portions thereof are elastically deformed.
Figure 11:
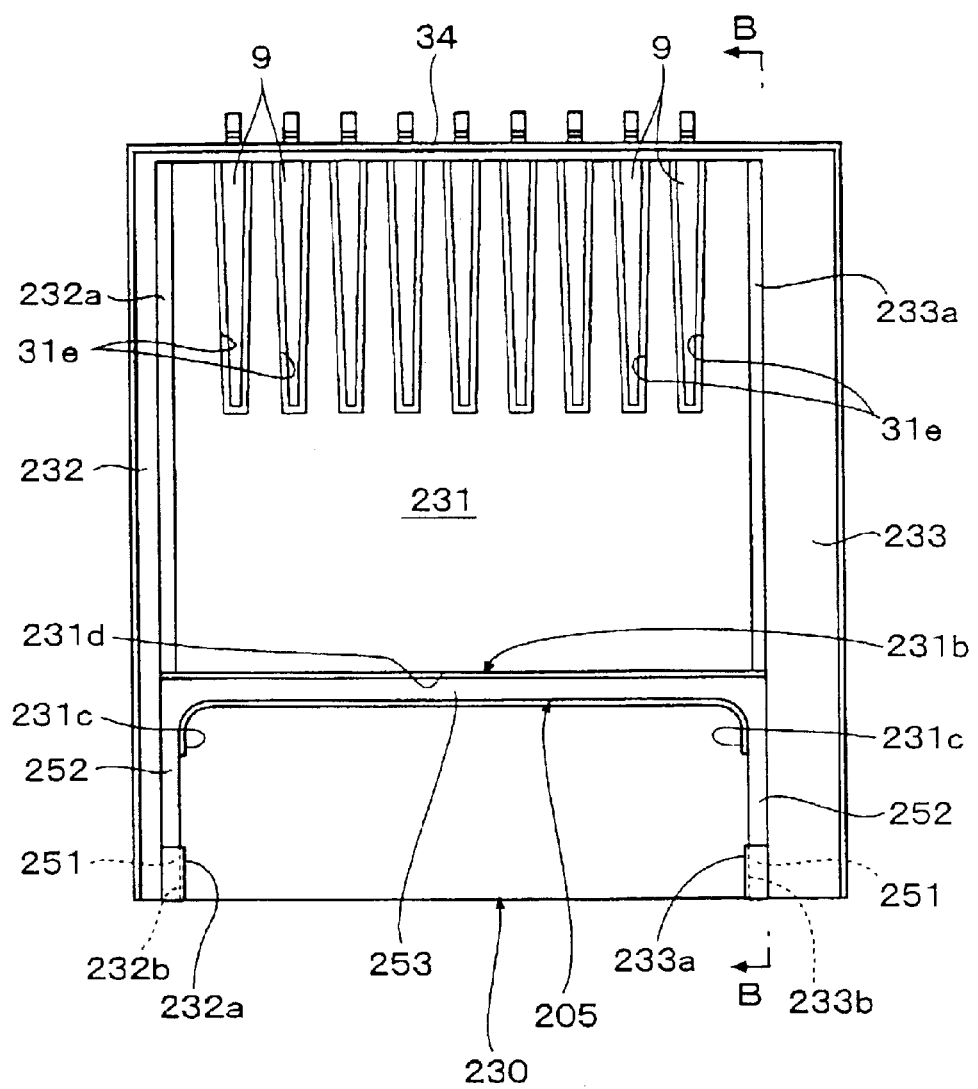
FIG. 11 is a plan view of the FIG. 9 card connector, with the cover removed therefrom.
Figure 12:
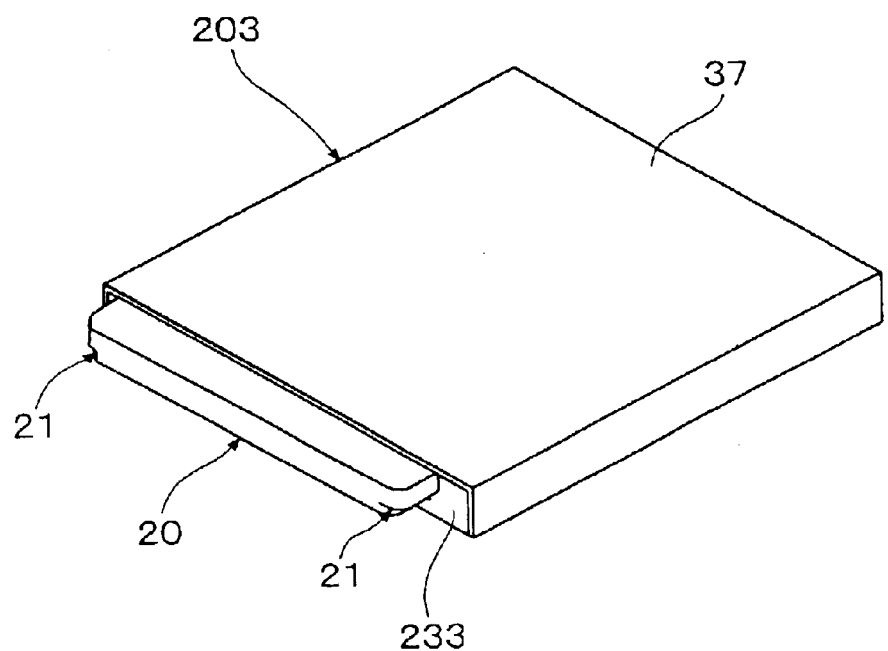
FIG. 12 is a perspective view of the appearance of the FIG. 9 card connector having the IC card of the predetermined size inserted therein.
Figure 13:
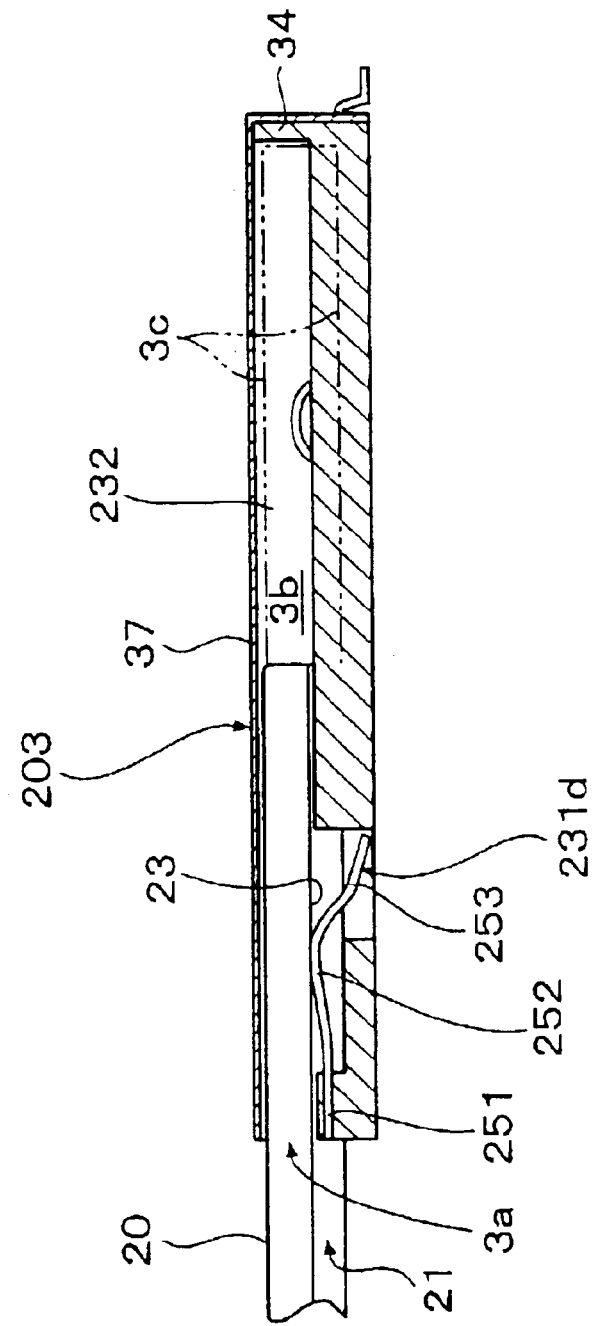
FIG. 13 is a cross-sectional view taken on line B—B of FIG. 11 and showing the FIG. 9 card connector having the IC card of the predetermined size inserted therein.
Figure 14:
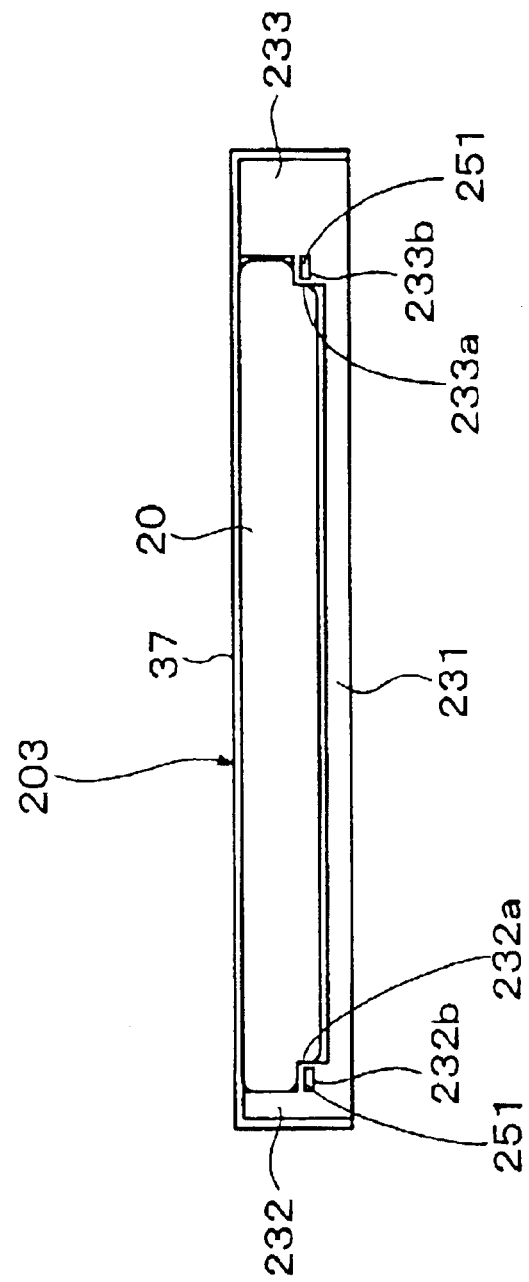
FIG. 14 is a front view of the FIG. 9 card connector having the IC card of the predetermined size inserted therein.
Figure 15:
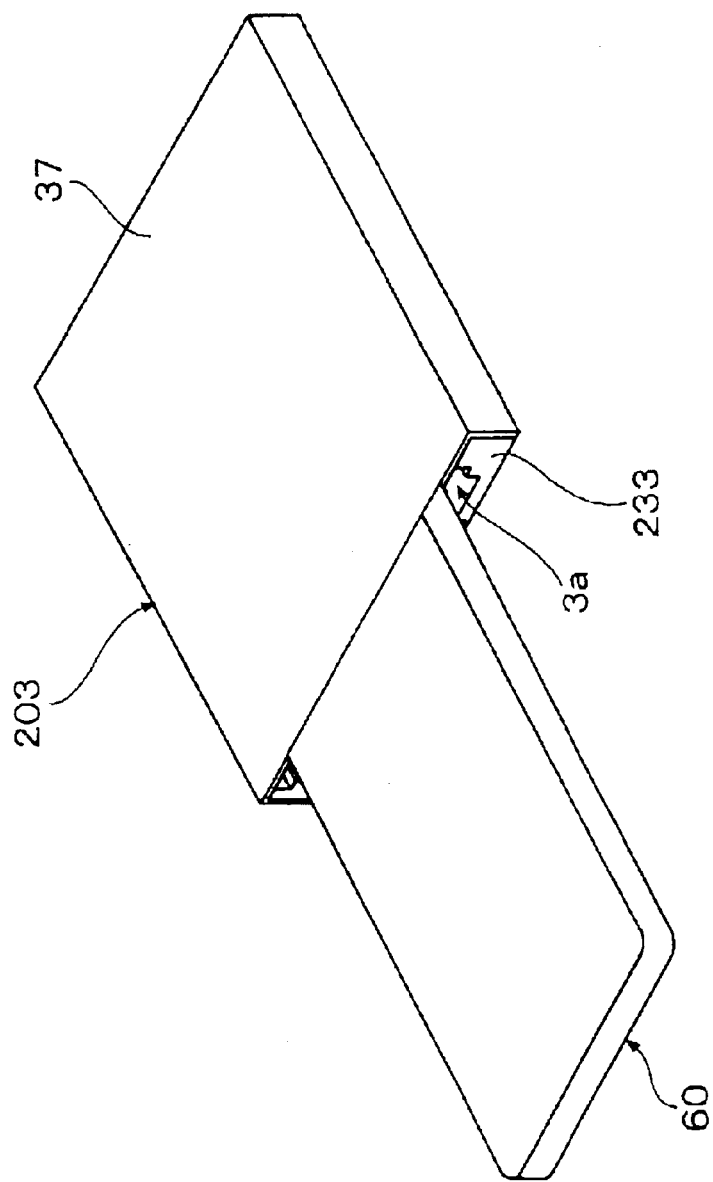
FIG. 15 is a perspective view of the appearance of the FIG. 9 card connector having an IC card inserted therein which is of a size smaller in width than the predetermined size.
Figure 16:
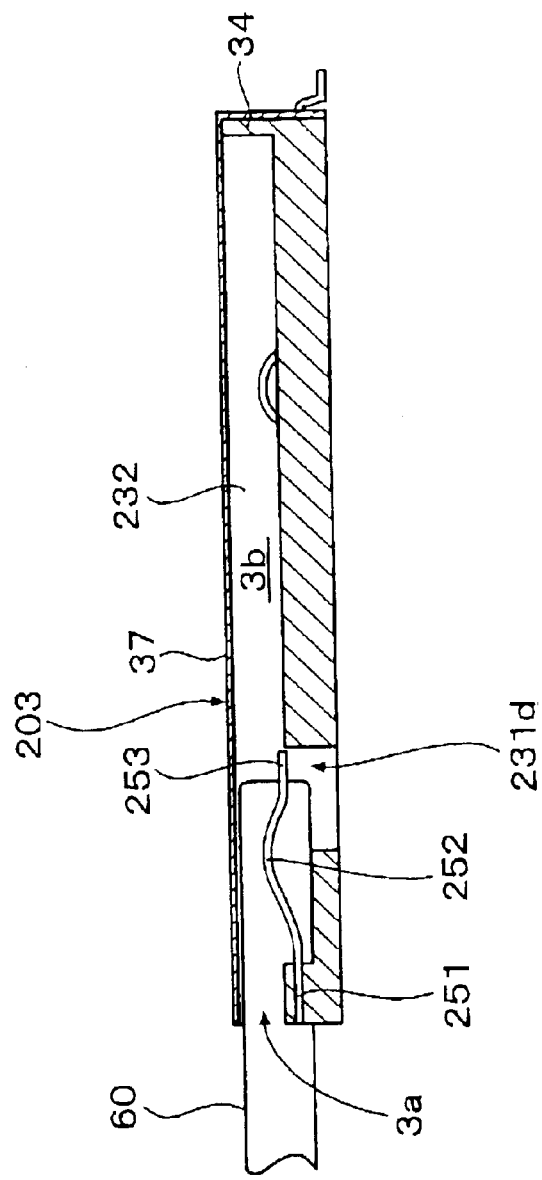
FIG. 16 is a cross-sectional view taken on line B—B of FIG. 11 and showing the FIG. 9 card connector having the IC card inserted therein which is of the size smaller in width than the predetermined size.
Figure 17:
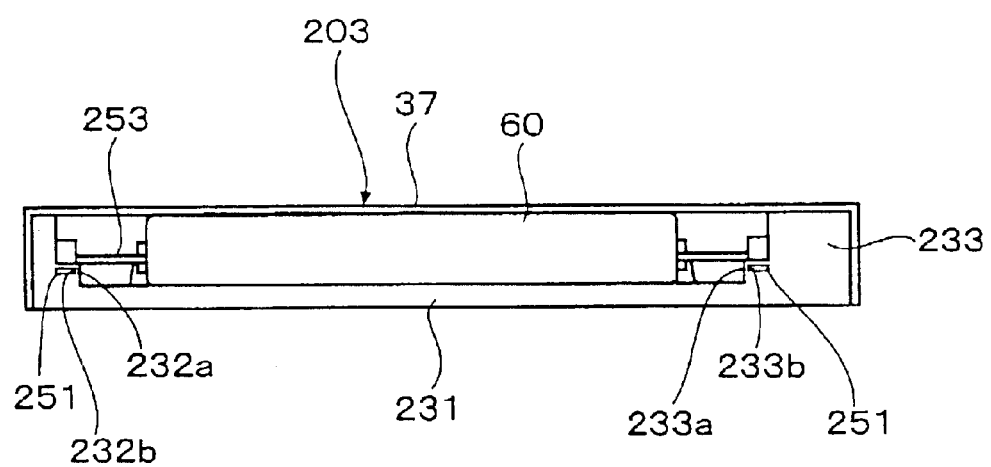
FIG. 17 is a front view of the FIG. 9 card connector having the IC card inserted therein which is of the size smaller in width than the predetermined size.

FIG. 9 is a perspective view of the internal construction of a card connector according to a second embodiment of the invention, with a cover removed therefrom and FIG. 10 is a perspective view of the FIG. 9 card connector in a state in which elastic portions thereof are elastically deformed. FIG. 11 is a plan view of the FIG. 9 card connector, with the cover removed therefrom. FIG. 12 is a perspective view of the appearance of the FIG. 9 card connector having the IC card of the predetermined size inserted therein. FIG. 13 is a cross-sectional view taken on line B—B of FIG. 11 and showing the FIG. 9 card connector in the state shown in FIG. 12, while FIG. 14 is a front view of the FIG. 9 card connector in the state shown in FIG. 12. FIG. 15 is a perspective view of the appearance of the FIG. 9 card connector having an IC card which is of a size smaller in width than the predetermined size inserted therein. FIG. 16 is a cross-sectional view taken on line B—B of FIG. 11 and showing the FIG. 9 card connector in the state shown in FIG. 15, while FIG. 17 is a front view of the FIG. 9 card connector in the state shown in FIG. 15.

The card connector of the second embodiment is only partially different in construction from the card connector of the first embodiment, and hence description of portions similarly constructed is omitted. In the following, a description will be given of only differences in construction from the first embodiment.

While the card connector according to the first embodiment prevents erroneous insertion of the IC card 40 of the size smaller in thickness than the predetermined size is inhibited, the card connector according to the second embodiment is distinguished therefrom in that it prevents insertion of an IC card 60 having a size smaller in width than the predetermined size.

An erroneous insertion-preventing member-receiving recess 231b formed in a bottom wall 231 of a housing 203 has a pair of elastic portion-receiving recesses 231c and a stopper-receiving recess 231d. The elastic portion-receiving recesses 231c are formed at respective spaced portions of keys 232a and 233a each divided into two segments, and extends longitudinally along side walls 232 and 233. The stopper-receiving recess 231d extends in a direction orthogonal to the direction of length of the side walls 232, 233 to join the pair of elastic portion-receiving recesses 231c.

The respective keys 232a, 233a of the side walls 232, 233 have front end portions thereof formed with retaining holes 232b, 233b, respectively.

An erroneous card insertion-preventing member 205 has a pair of fixed portions 251, a pair of elastic portions 252, and a smaller width-card stopper 253. The fixed portions 251 are retained in respective states inserted into the retaining holes 232b, 233b. The elastic portions 252 are continuous with the fixed portions 251, and extend longitudinally along the side walls 232, 233, respectively. The elastic portions 252 are positioned above the respective elastic portion-receiving recesses 231c. These elastic portions 252 extend immediately inward of the side walls 232, 233 along the same, and are formed to have as small a lateral width as possible, provided that they have a required elasticity. The smaller width-card stopper 253 extends in the direction orthogonal to the direction of length of the side walls 232, 233 to join the elastic portions 252. The smaller width-card stopper 253 is positioned above the stopper-receiving recess 231d so long as the elastic portions 252 are not elastically deformed.

Next, the operation of the card connector of the present embodiment will be described.

As shown in FIGS. 12 to 14, when one end of an IC card 20 of the predetermined size is inserted through the card insertion port 3a, the elastic portions 252 are pressed downward by stepped surfaces 23 formed on the lateral sides of the bottom of the IC card 20 and facing the cutouts 21, so as to be elastically deformed by a predetermined amount. As a result, the elastic portions 252 are pushed out of the card insertion path 3c and brought into the cutouts 21 of the IC card 20. In accordance with this motion of the elastic portions 52, the smaller width-card stopper 253 is also pushed out of the card insertion path 3c to be received in the stopper-receiving recess 231d (see FIG. 13). As a result, the smaller width-card stopper 253 is kept from contact with the IC card 20, so that the smaller width-card stopper 253 cannot block the advance of the IC card 20, and hence the IC card is allowed to be inserted to the inner end of the card-receiving space 3b.

As shown in FIGS. 15 to 17, when one end of an IC card 60 of a size smaller in width than the predetermined size is inserted through the card insertion port 3a, the elastic portions 252 do not make contact with the IC card 60. Therefore, the elastic portions 252 are not elastically deformed, but stay on the card insertion path 3c, and hence the smaller width-card stopper 253 also stays on the card insertion path 3c. Consequently, if the IC card 60 is attempted to be inserted deeper into the card-receiving space 3b, the forward end face of the IC card 60 is bought into abutment with the smaller width-card stopper 253, which prevents further advance of the IC card 60.

As described above, the card connector of the present embodiment makes it possible to prevent erroneous insertion of the IC card 60 of the size smaller in width than the predetermined size, using an erroneous card insertion-preventing member 205 having a simple construction.

Figure 18:
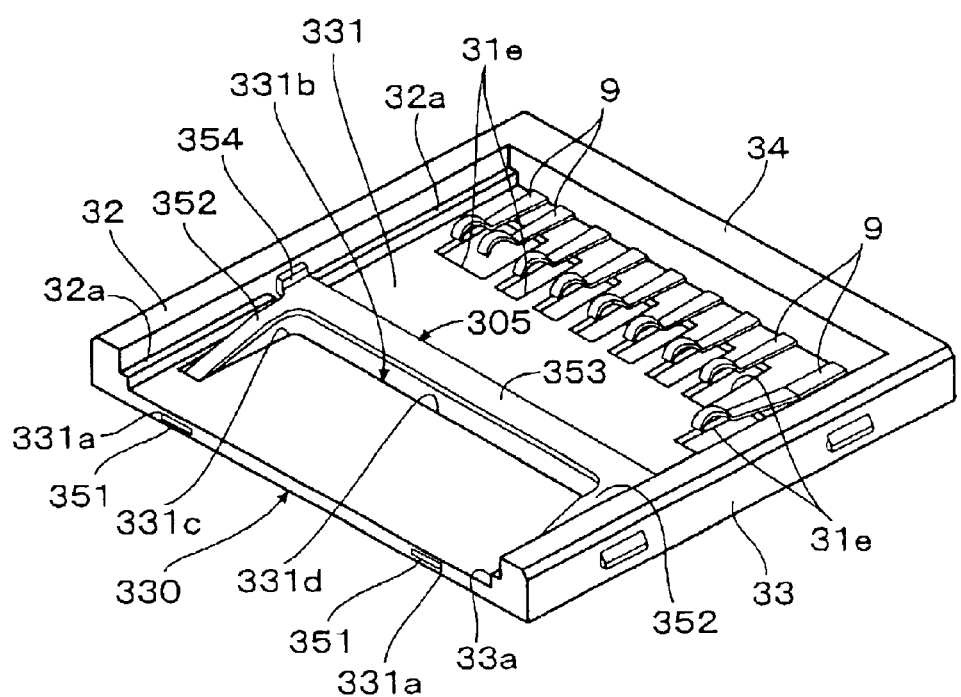
FIG. 18 is a perspective view of a card connector according to a third embodiment of the invention, with a cover removed therefrom.
Figure 19:
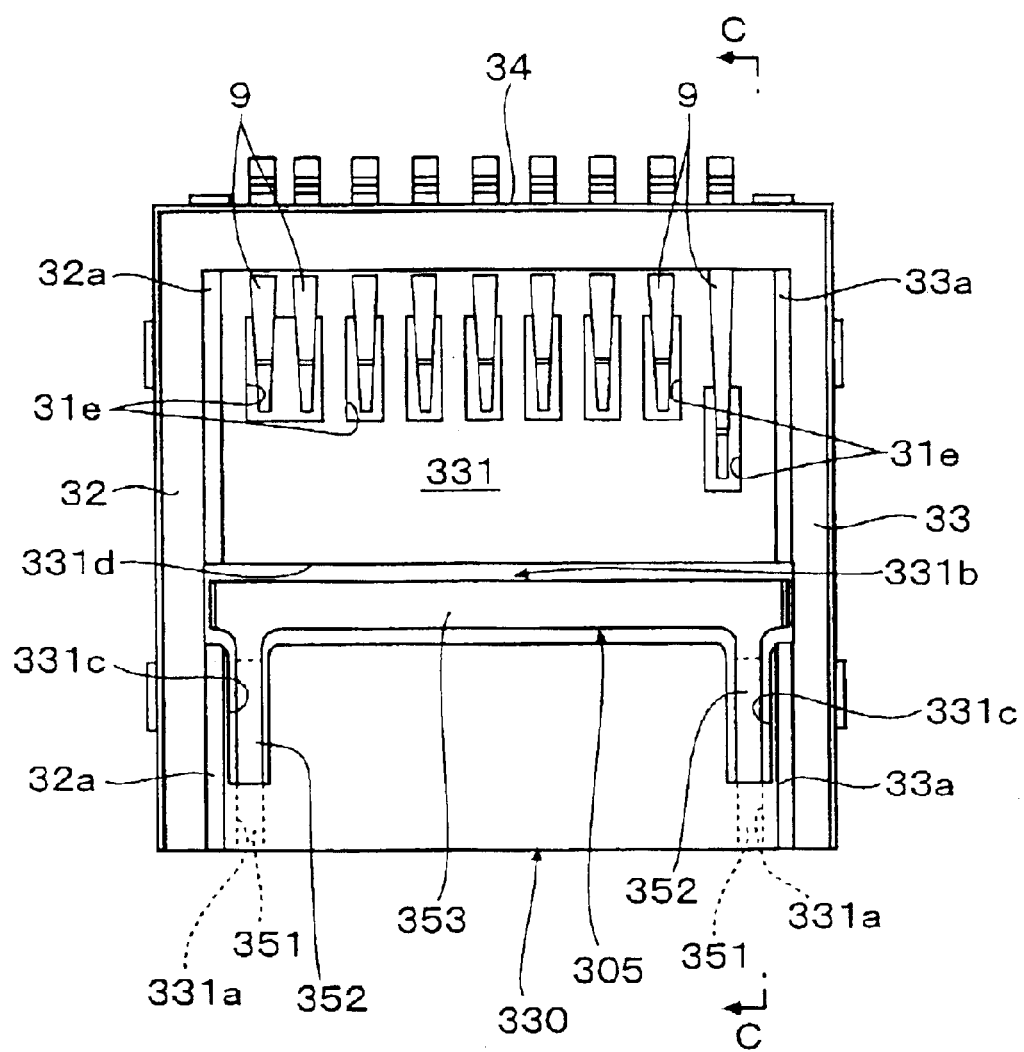
FIG. 19 is a plan view of the FIG. 18 card connector, with a cover removed therefrom.
Figure 20:
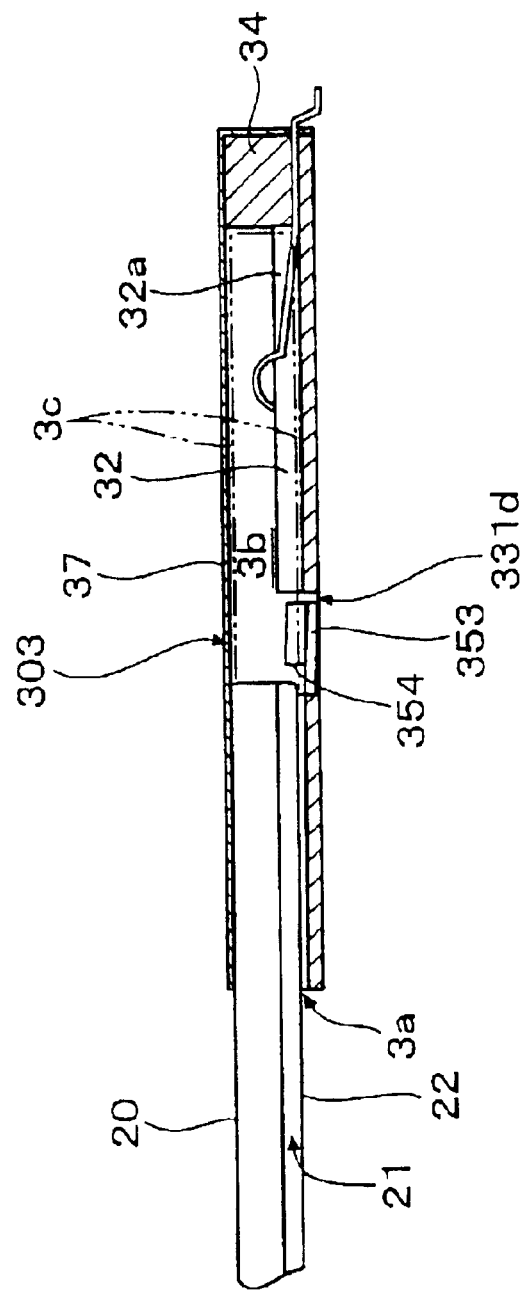
FIG. 20 is a cross-sectional view taken on line C—C of FIG. 19 and showing the FIG. 18 card connector having the IC card of the predetermined size inserted therein.
Figure 21:
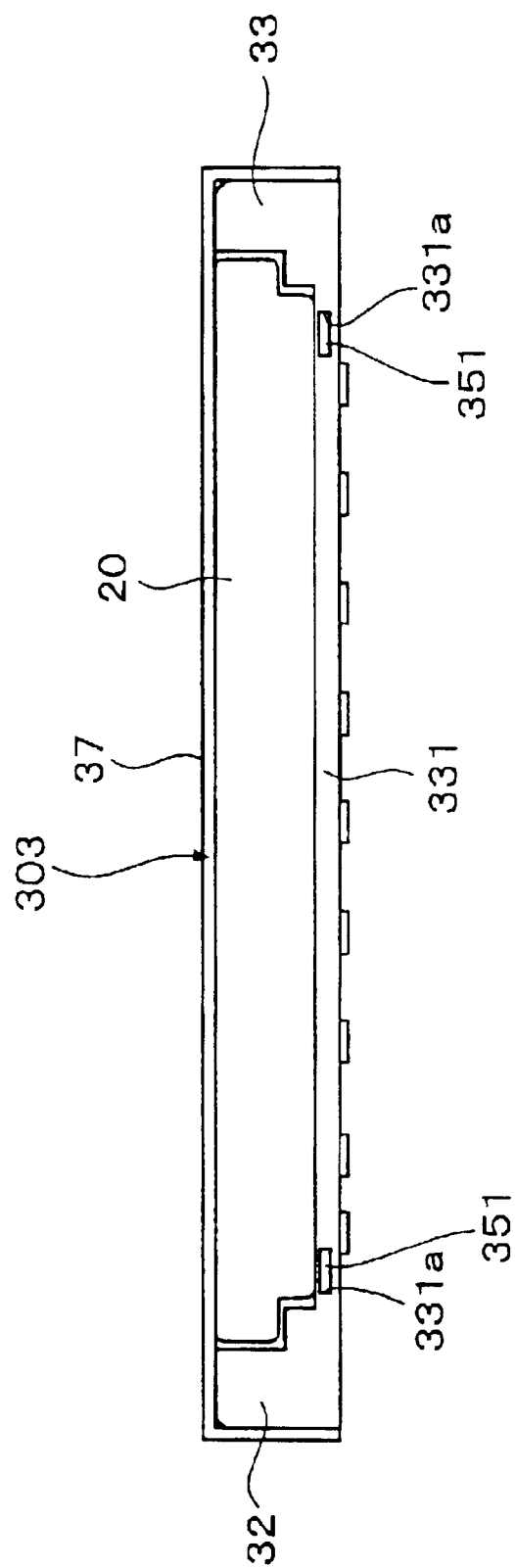
FIG. 21 is a front view of the FIG. 18 card connector having the IC card of the predetermined size inserted therein.
Figure 22:
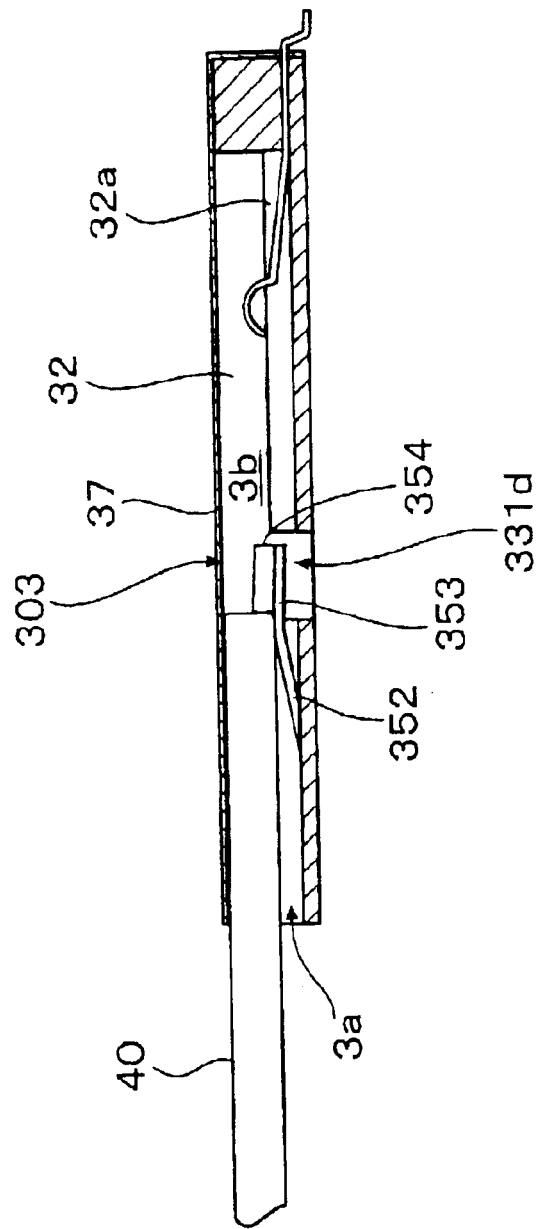
FIG. 22 is a cross-sectional view taken on line C—C of FIG. 19 and showing the FIG. 18 card connector having the IC card inserted therein which is of the size smaller in thickness than the predetermined size.
Figure 23:
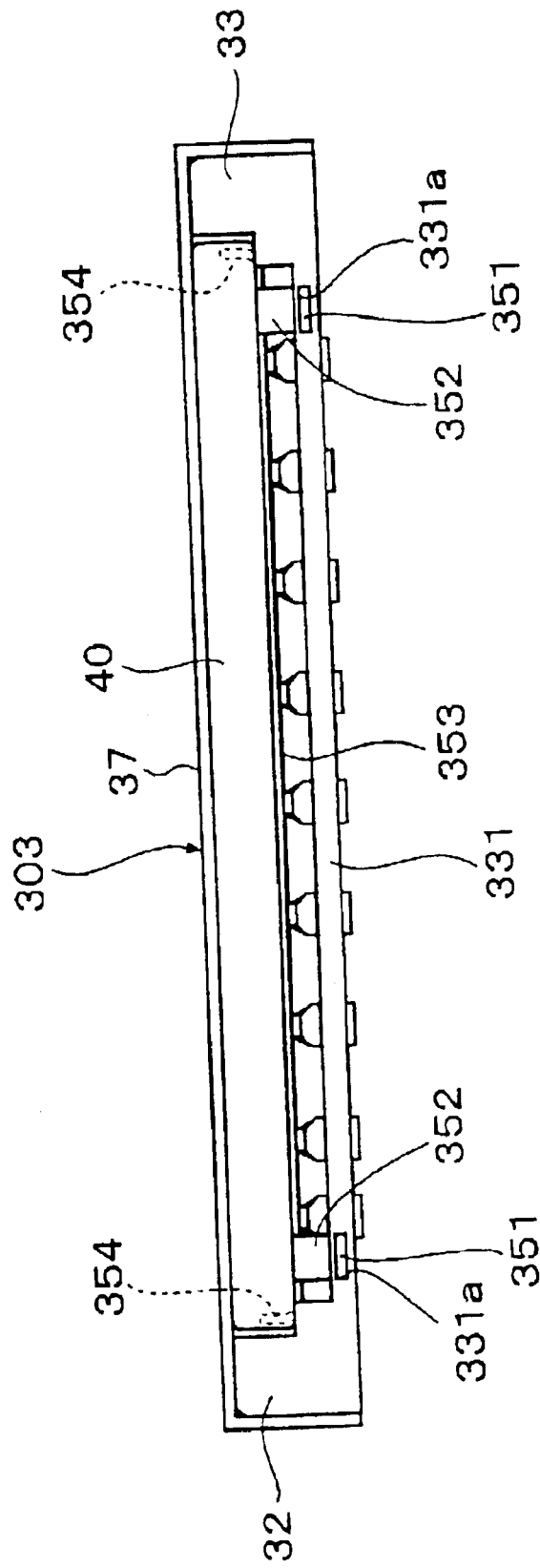
FIG. 23 is a front view of the FIG. 18 card connector having the IC card inserted therein which is of the size smaller in thickness than the predetermined size.
Figure 24:
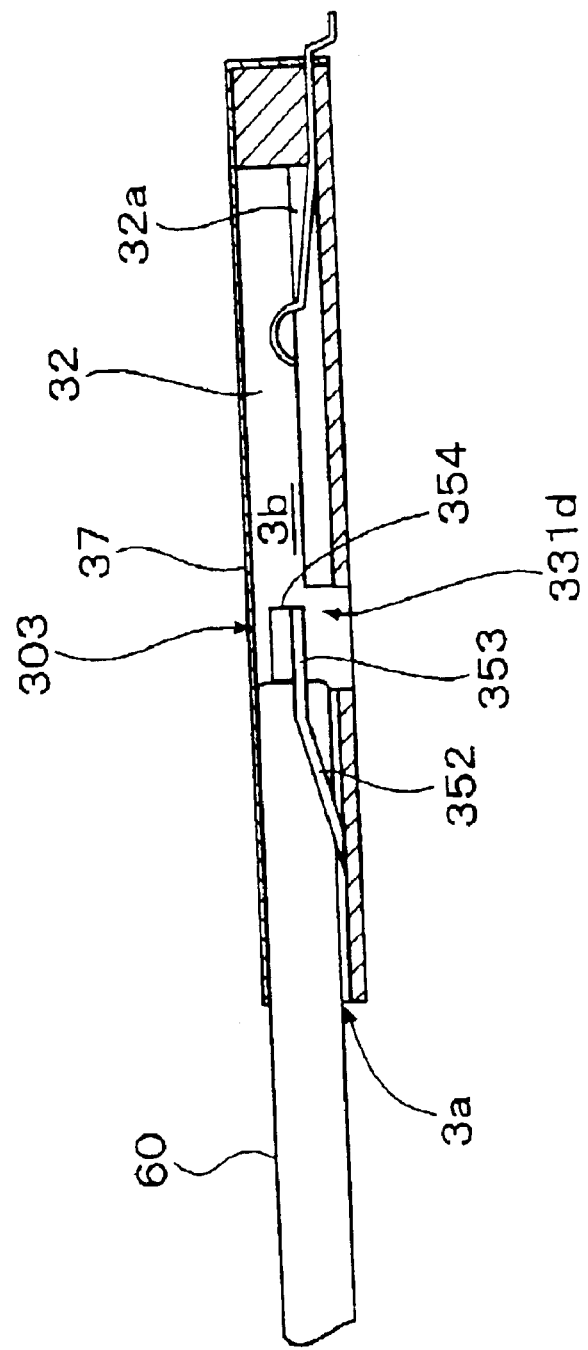
FIG. 24 is a cross-sectional view taken on line C—C of FIG. 19 and showing the FIG. 18 card connector having the IC card inserted therein which is of the size smaller in width than the predetermined size.
Figure 25:
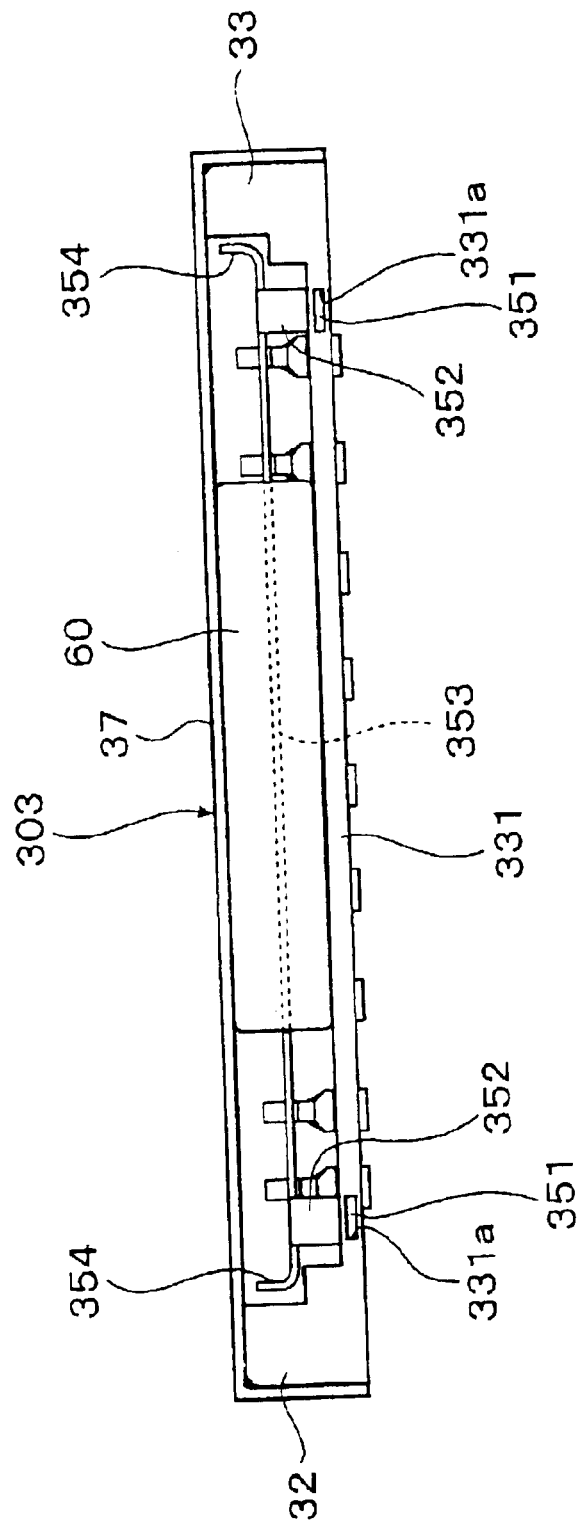
FIG. 25 is a front view of the FIG. 18 card connector having the IC card inserted therein which is of the size smaller in width than the predetermined size.

FIG. 18 is a perspective view of a card connector according to a third embodiment of the invention, with a cover removed therefrom, and FIG. 19 is a plane view of the same. FIG. 20 is a cross-sectional view taken on line C—C of FIG. 19 and showing the FIG. 18 card connector having the IC card of the predetermined size inserted therein. FIG. 21 is a front view of the FIG. 18 card connector in the state shown in FIG. 20. FIG. 22 is a cross-sectional view taken on line C—C of FIG. 19 and showing the FIG. 18 card connector having the IC card inserted therein which is of the size smaller in thickness than the predetermined size. FIG. 23 is a front view of the FIG. 18 card connector in the state shown in FIG. 22. Further, FIG. 24 is a cross-sectional view taken on line C—C of FIG. 19 and showing the FIG. 18 card connector having the IC card inserted therein which is of the size smaller in width than the predetermined size, while FIG. 25 is a front view of the FIG. 18 card connector in the state shown in FIG. 24.

The card connector of the third embodiment is only partially different in construction from the card connector of the first embodiment, and hence description of portions similarly constructed is omitted. In the following, a description will be given of only differences in construction from the first embodiment.

While the card connector according to the first embodiment prevents erroneous insertion of the IC card 40 having the size smaller in thickness than the predetermined size, and that according to the second embodiment prevents erroneous insertion of the IC card 60 having the size smaller in width than the predetermined size, the card connector according to the third embodiment is distinguished from these card connectors in that it prevents erroneous insertion of both the IC card 40 and the IC card 60.

A housing body 330 of a housing 303 has a pair of retaining holes 331a formed in respective opposite side portions of a bottom wall 331 thereof.

An erroneous insertion-preventing member-receiving recess 331b formed in the bottom wall 331 has a pair of elastic portion-receiving recesses 331c and a stopper-receiving recess 331d. The elastic portion-receiving recesses 331c are formed adjacent to the keys 32a, 33a, and extend longitudinally along the side walls 32, 33 of the housing body 330, respectively. The stopper-receiving recess 331d extends in a direction orthogonal to the direction of length of the side walls 32, 33 to join the pair of elastic portion-receiving recesses 331c.

An erroneous card insertion-preventing member 305 has a pair of fixed portions 351, a pair of elastic portions 352, a smaller width-card stopper 353, and a pair of smaller thickness-card stoppers 354. The fixed portions 351 are retained in respective states inserted into the retaining holes 331a. The elastic portions 352 are continuous with the respective fixed portions 351, and extend longitudinally along the side walls 32, 33 through the elastic portion-receiving recesses 331c, respectively. The smaller width-card stopper 353 extends in the direction orthogonal to the direction of length of the side walls 32, 33 to join the elastic portions 352. The smaller width-card stopper 353 is positioned above the stopper-receiving recess 331d so long as the elastic portions 352 are not elastically deformed. The smaller thickness-card stoppers 354 are formed continuous with the respective opposite ends of the smaller width-card stopper 353, and extend in the direction of height of the side walls 32, 33.

Next, the operation of the card connector of the present embodiment will be described.

As shown in FIGS. 20 and 21, when one end of an IC card 20 of the predetermined size is inserted through the card insertion port 3a, the card connector operates as described in the first embodiment, so that the advance of the IC card 20 is not blocked.

As shown in FIGS. 22 and 23, when one end of an IC card 40 of the size smaller in thickness than the predetermined size is inserted through the card insertion port 3a, the smaller thickness-card stoppers 354 block the advance of the IC card 40 as described in the first embodiment.

As shown in FIGS. 24 and 25, when one end of an IC card 60 of the size smaller in width than the predetermined size is inserted through the card insertion port 3a, the smaller width-card stopper 353 blocks the advance of the IC card 60 as described in the second embodiment.

As described above, the card connector of the present embodiment makes it possible to prevent erroneous insertion of both the IC card 40 of the size smaller in thickness than the predetermined size and the IC card 60 of the size smaller in width than the predetermined size, using the erroneous card insertion-preventing member 305 having a simple construction.

Although in each of the first to third embodiments, the invention is applied to a card connector, this is not limitative, but the invention is applicable to any card socket which allows insertion and ejection of a card, including as an IC card, and a magnetic card.

It is further understood by those skilled in the art that the foregoing are the preferred embodiments of the invention, and that various changes and modifications may be made without departing from the spirit and scope thereof.

What is claimed is:

1. A card socket comprising:
   a housing having a card insertion port and a card-receiving space that receives a card inserted through the card insertion port;
   an elastic member that is arranged on a card insertion path extending from the card insertion port to an inner end of the card-receiving space, for being brought into contact with the card on condition that the card has a predetermined size, to thereby undergo elastic deformation such that said elastic member is pushed out of the card insertion path; and
   a stopper that is coupled to said elastic member, and arranged on the card insertion path, for being pushed out of the card insertion path in accordance with the elastic deformation of said elastic member to allow the advance of the card when the card has the predetermined size, and for remaining on the card insertion path to block the advance of the card when the card has a size smaller than the predetermined size.

2. A card socket according to claim 1, wherein said housing includes an elastic member-receiving recess for receiving said elastic member that has undergone the elastic deformation to be pushed out of the card insertion path, and a stopper-receiving recess for receiving said stopper that has been pushed out of the card insertion path in accordance with the elastic deformation of said elastic member.

3. A card socket according to claim 2, further comprising a fixing member that is integrally formed with said elastic member, for fixing said elastic member to a front end of the housing at a location out of the card insertion path, and wherein said elastic member is arranged such that said elastic member extends obliquely from the fixing member into the card insertion path when said elastic member has not undergone the elastic deformation, and wherein said stopper is integrally formed with said elastic member at an opposite side to said fixing member with respect to a card-inserting direction.

4. A card socket according to claim 3, wherein said stopper vertically projects from at least one of two lateral sides of said elastic member, and wherein said stopper-receiving recess comprises at lest one cutout formed in a manner associated with said stopper such that said at least one cutout each divides a corresponding one of keys provided at inner lateral walls of the housing, whereby said card socket prevents insertion of the card when the card has a thickness smaller than a thickness of the predetermined size.

5. A card socket according to claim 3, wherein said elastic member comprises a pair of elastic members extending in the form of a strip along immediately inward of inner lateral walls of the housing, and wherein said stopper extends laterally such that said stopper connects said pair of elastic members, and wherein said stopper-receiving recess is laterally formed in an inner bottom of the housing in association with said stopper, whereby said card socket prevents insertion of the card when the card has a width smaller than a width of the predetermined size.

6. A card socket according to claim 3, wherein said elastic member comprises a pair of elastic members extending in the form of a strip along inner lateral walls of the housing, and wherein said stopper comprises a first stopper vertically projecting from at least one of two lateral sides of said elastic member, and a second stopper extending laterally such that said second stopper connects said pair of elastic members, and wherein said stopper-receiving recess comprises at lest one cutout formed in association with said first stopper such that said at least one cutout each divides a corresponding one of keys provided at the inner lateral walls, and a lateral recess laterally formed in an inner bottom of the housing in association with said second stopper, whereby said card socket prevents insertion of the card when the card has a thickness smaller than a thickness of the predetermined size or a width smaller than a width of the predetermined size.

7. A card socket including a housing having a card insertion port and a card-receiving space that receives a card inserted through the card insertion port, and erroneous card insertion-preventing means that when the card has a predetermined thickness, allows insertion of the card to an inner end of the card-receiving space, and when the card has a thickness smaller than the predetermined thickness, prevents insertion of the card toward the inner end of the card-receiving space,
   wherein the erroneous card insertion-preventing means comprises:
   a fixed portion fixed to the housing;
   an elastic portion coupled to said fixed portion, for being elastically deformed when a card having the predetermined thickness is inserted through the card insertion port, to be pushed out of a card insertion path extending from the card insertion port to the inner end of the card-receiving space, and for not being elastically deformed when a card having a thickness smaller than the predetermined thickness is inserted through the card insertion port, to remain on the card insertion path; and
   a stopper coupled to said elastic portion, for being moved out of the card insertion path when said elastic portion is pushed out of the card insertion path, to thereby allow the advance of the card having the predetermined thickness, and for remaining on the card insertion path when said elastic portion is not pushed out of the card insertion path, to thereby block the advance of the card having the thickness smaller than the predetermined thickness.

8. A card socket including a housing having a card insertion port and a card-receiving space that receives a card inserted through the card insertion port, and erroneous card insertion-preventing means that when the card has a predetermined width, allows insertion of the card to an inner end of the card-receiving space, and when the card has a width smaller than the predetermined width, prevents insertion of the card toward the inner end of the card-receiving space,
   wherein the erroneous card insertion-preventing means comprises:
   a fixed portion fixed to the housing;
   an elastic portion coupled to said fixed portion, for being elastically deformed when a card having the predetermined width is inserted through the card insertion port, to be pushed out of a card insertion path extending from the card insertion port to the inner end of the card-receiving space, and for not being elastically deformed when a card having a width smaller than the predetermined width is inserted through the card insertion port, to remain on the card insertion path; and
   a stopper coupled to said elastic portion, for being moved out of the card insertion path when said elastic portion is pushed out of the card insertion path, to thereby allow the advance of the card having the predetermined width, and for remaining on the card insertion path when said elastic portion is not pushed out of the card insertion path, to thereby block the advance of the card having the width smaller than the predetermined width.

9. A card socket including a housing having a card insertion port and a card-receiving space that receives a card inserted through the card insertion port, and erroneous card insertion-preventing means that when the card has a predetermined thickness and a predetermined width, allows insertion of the card to an inner end of the card-receiving space, and when the card has a thickness smaller than the predetermined thickness or a width smaller than the predetermined width, prevents insertion of the card toward the inner end of the card-receiving space, wherein the erroneous card insertion-preventing means comprises:

a fixed portion fixed to the housing;

an elastic portion coupled to said fixed portion, for being elastically deformed when a card having the predetermined thickness and the predetermined width is inserted through the card insertion port, to be pushed out of a card insertion path extending from the card insertion port to the inner end of the card-receiving space, and for not being elastically deformed when a card having a thickness than smaller the predetermined thickness or a width smaller than the predetermined width is inserted through the card insertion port, to remain on the card insertion path; and a stopper coupled to said elastic portion, for being moved out of the card insertion path when said elastic portion is pushed out of the card insertion path, to thereby allow the advance of the card having the predetermined thickness and width, and for-remaining on the card insertion path when said elastic portion is not pushed out of the card insertion path, to thereby block the advance of the card having the thickness smaller than the predetermined thickness or the width smaller than the predetermined width.

* * * * *